United States Patent
Nehls (10) Patent No.: US 7,658,356 B1
(45) Date of Patent: Feb. 9, 2010

(54) MOUNTING BRACKET FOR SOLAR PANEL APPLICATIONS

(75) Inventor: Charles Olen Nehls, Allen Park, MI (US)

(73) Assignee: Unistrut International Corporation, Wayne, MI (US)

( * ) Notice: Subject to any disclaimer, the term of this patent is extended or adjusted under 35 U.S.C. 154(b) by 0 days.

(21) Appl. No.: 12/361,920

(22) Filed: Jan. 29, 2009

(51) Int. Cl.
*A47F 5/00* (2006.01)

(52) U.S. Cl. ........................................ 248/300; 248/237

(58) Field of Classification Search .................. 248/300
See application file for complete search history.

(56) References Cited

U.S. PATENT DOCUMENTS

| | | | | |
|---|---|---|---|---|
| 3,466,071 | A | * | 9/1969 | Reed ........................... 403/231 |
| 5,170,976 | A | * | 12/1992 | Lundman ..................... 248/300 |
| 5,398,902 | A | * | 3/1995 | Crowe ......................... 248/300 |
| 5,617,680 | A | | 4/1997 | Beatty |
| 5,681,021 | A | * | 10/1997 | Noll ............................ 248/357 |
| 6,046,399 | A | | 4/2000 | Kapner |
| 6,809,251 | B2 | | 10/2004 | Dinwoodie |
| 6,930,238 | B2 | | 8/2005 | Makita et al. |
| 6,948,687 | B2 | | 9/2005 | Shatzky |
| 2006/0016947 | A1 | | 1/2006 | Capozzi et al. |
| 2006/0053706 | A1 | | 3/2006 | Russell |
| 2007/0144105 | A1 | | 6/2007 | Blanchard |

* cited by examiner

*Primary Examiner*—J. Allen Shriver, II
*Assistant Examiner*—Erin Smith (57) ABSTRACT

A bracket is disclosed for attaching solar panels to roof structures. The bracket may comprise first, second and third planar portions, the first and third portions generally parallel to each other, and the second planar portion disposed at an oblique angle with respect to first and third portions. The first portion may have a plurality of elongated stiffening members disposed at oblique angles with respect to a longitudinal axis of the bracket. Gussets may be provided across the transition between the first and second portions, and the transition between the second and third portions. The gussets and stiffening members are shaped, sized and oriented to enhance the strength of the bracket. The bracket may have a drain hole to allow water to pass through the bracket, and a plurality of fastener holes are provided to enable the bracket to attach to a variety of different solar panels and roof structures.

32 Claims, 7 Drawing Sheets

MOUNTING BRACKET FOR SOLAR PANEL APPLICATIONS

BACKGROUND OF THE INVENTION

1. Field of the Invention

Embodiments of the invention generally relate to the field of mounting brackets, and more particularly to the field of mounting brackets for use in securing solar panels in roof-top applications.

2. Discussion of Related Art

Roof mounted solar panels are used to convert solar energy to electrical power or to generate hot water. These devices have been utilized in these applications for many years. A typical solar panel installation is comprised of a roof mounted grid system employing one of many various types of structural products including strut, angle iron and wood. The grid may be anchored to structural elements of the building or it may be mounted to the roof surface. Solar panels are attached to these grid systems through various hardware devices, frequently without regard for engineered wind or snow loading requirements. The roofs may be flat or pitched, using rafter, truss or purlin supports, and may be finished with built-up multi-ply, membrane, steel, fiberglass shingle or other roof surface treatments.

With the recent emphasis placed upon alternative energy sources, there is a need for a universal mounting bracket for use with all the aforementioned various construction methods and finishing treatments. Such a universal bracket should be engineered to provide known load bearing capacities, should be easily installable and should provide a fastening method for quick and easy attachment of solar grids. The bracket should be capable of integration into various grid design and product alternatives.

SUMMARY OF THE INVENTION

A bracket is disclosed, comprising first, second and third planar portions oriented along a bracket longitudinal axis. The first planar portion may have first and second ends and an upper surface defining a first plane. The first planar portion may further have a plurality of elongated stiffening members with longitudinal axes oriented at an oblique angle with respect to the bracket longitudinal axis. The second planar portion may have first and second ends and an upper surface defining a second plane. The third planar portion may have first and second ends and an upper surface defining a third plane.

The second end of the first planar portion may be connected to the first end of the second planar portion, and the second end of the second planar portion may be connected to the first end of the third planar portion such that the first and third planes are substantially parallel and the second plane is disposed at an oblique angle with respect to the first and third planes. The first and second planar portions may further comprise first and second reinforcing members that span the connection between the first and second planar portions. The first and second reinforcing members may have apices disposed above the upper surfaces of the first and second planar portions. The second and third planar portions further may comprise a third reinforcing member that spans the connection between the second and third planar portions. The third reinforcing member further may have an apex disposed below the upper surfaces of the second and third planar portions.

A solar panel support system is also disclosed, comprising a solar panel support grid and a bracket comprising first, second and third planar portions oriented along a bracket longitudinal axis. The first planar portion may have first and second ends and an upper surface defining a first plane. The first planar portion further may have a plurality of elongated stiffening members with longitudinal axes oriented at an oblique angle with respect to the bracket longitudinal axis. The second planar portion may have first and second ends and an upper surface defining a second plane. The third planar portion may have first and second ends and an upper surface defining a third plane.

The second end of the first planar portion may be connected to the first end of the second planar portion, and the second end of the second planar portion may be connected to the first end of the third planar portion such that the first and third planes are substantially parallel and the second plane is disposed at an oblique angle with respect to the first and third planes. The first and second planar portions further may comprise first and second reinforcing members that span the connection between the first and second planar portions. The first and second reinforcing members may have apices disposed above the upper surfaces of the first and second planar portions. The second and third planar portions further may comprise a third reinforcing member that spans the connection between the second and third planar portions. The third reinforcing member further may have an apex disposed below the upper surfaces of the second and third planar portions. The third planar portion of the bracket may be engaged with the solar panel support grid via fasteners disposed in the fastener holes of the third planar portion. The first planar portion of the bracket may be engaged with the roof structure via fasteners disposed in the fastener holes of the first planar portion.

BRIEF DESCRIPTION OF THE DRAWINGS

The accompanying drawings illustrate preferred embodiments of the disclosed method so far devised for the practical application of the principles thereof, and in which.

DESCRIPTION OF EMBODIMENTS

A universal bracket design is disclosed for use in securing solar panels to roof top structures. Due to its strength-efficient design, the bracket may be manufactured from relatively light gage steel, and formed in a manner as to provide high strength in both tension and compression to offset in-situ forces such as wind lift and snow loads. The disclosed bracket design has features that enable attachment to a roof structure axially (along the bracket's longitudinal axis, such as in rafter or truss applications), or along the bracket's transverse axis (such as in purlin applications). Also incorporated into the bracket design are provisions to attach strut or other grid materials either axially or along the transverse axis. In addition, the disclosed bracket may be sized and shaped to provide a desired "stand-off" dimension which positions the solar panels—to which the brackets are attached—a predetermined distance above the roof surface, thereby facilitating appropriate drainage and air-flow around the panels.

The bracket may have a variety of features that enable mechanical attachment through roofing treatments using bolts, lag screws, screw nails or common nails. In addition, the bracket may be configured such that it can be installed under a layer of fiberglass roofing material (often used in residential roofing) without interfering with proper roof drainage or causing undesirable snow accumulation.

Figure 1:
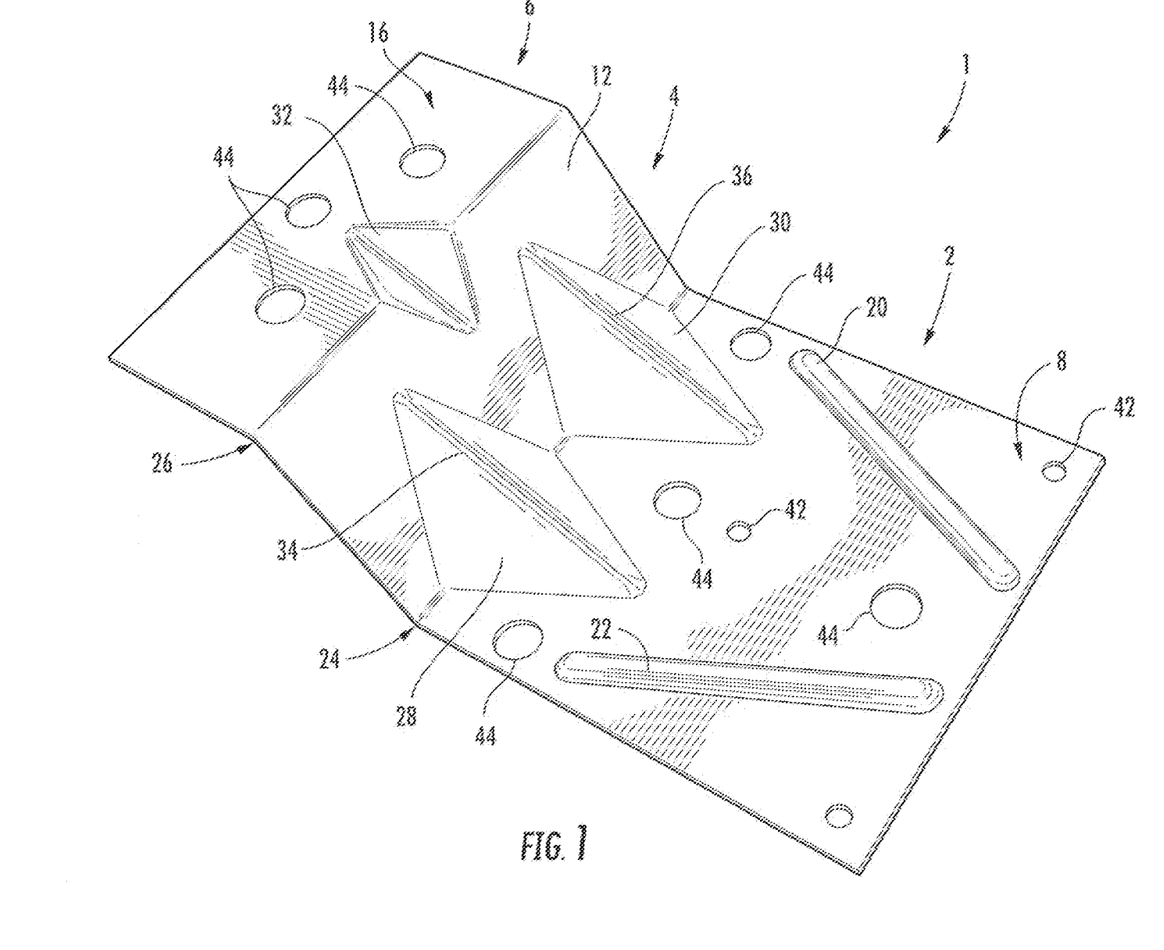
FIG. 1 is an isometric view of the disclosed bracket.
Figure 2:
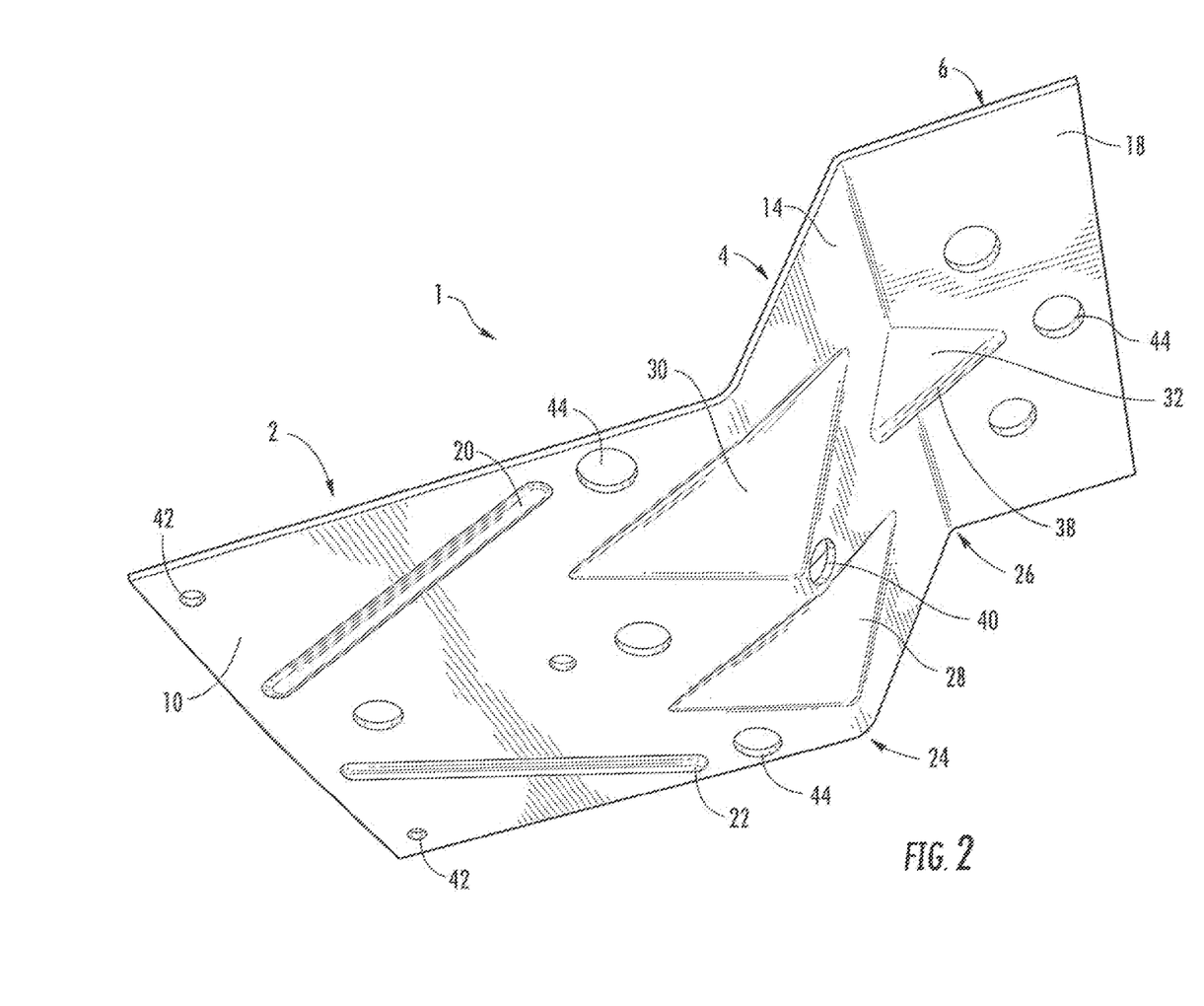
FIG. 2 is a reverse isometric view of the bracket of FIG. 1.

Referring now to FIGS. 1 and 2, the bracket 1 may have a generally "z-shaped" body comprising first, second and third generally planar portions 2, 4, 6 each having respective upper and lower surfaces 8, 10, 12, 14, 16, 18. The upper (and lower) surfaces of the first and third generally planar portions 2, 6 may form planes that are substantially parallel to each other, while the upper and lower surfaces of the second generally planar portion 4 may form planes that are obliquely angled with respect to the planes formed by the first and third generally planar portions 2, 6.

The bracket 1 may have a plurality of strength enhancing features to increase the strength of the bracket in tension and compression, both longitudinally and transversely. Thus, first and second elongated stiffening members 20, 22 may be disposed in or on the first generally planar portion 2. In the illustrated embodiment, the stiffening members 20, 22 comprise discrete raised sections that are formed by stamping, pressing, or the like, resulting in elongated discontinuities in the upper and lower surfaces 8, 10 of the first generally planar portion 2. The stiffening members 20, 22 may also be disposed at oblique angles "α" with respect to the longitudinal axis "A-A" of the bracket 1 (see FIG. 3). As will be appreciated, providing such raised and angled discontinuities in the generally planar portion 2 may substantially enhance the stiffness of the portion 2.

The first and second generally planar portions 2, 4 are connected at a first transition (bend) 24, while the second and third generally planar portions 4, 6 are connected at a second transition (bend) 26. It will be appreciated that such transitions 24, 26 are often weak points in a structure. Thus, to strengthen these transitions a plurality of reinforcing members (i.e., gussets) 28, 30, 32 may be disposed across the transitions. In the illustrated embodiment, these reinforcing members 28, 30, 32 comprise raised "V-shaped" triangular stiffening members, though it will be appreciated that the gussets may be provided in shapes other than "V" shapes. First and second reinforcing members 28, 30 are provided across transition 24, while a third reinforcing member 32 is provided across transition 26. The first, second and third reinforcing members have "ridges," or apices, 34, 36, 38. The apices 34, 36 of the first and second reinforcing members 28, 30 are positioned above the upper surfaces 8, 12 of the first and second generally planar portions 2, 4, while the apex 38 of the third reinforcing member 32 is positioned below the lower surfaces 14, 18 of the second and third generally planar portions 4, 6. Thus positioned, the reinforcing members 28, 30, 32 act as trusses that strengthen the bracket 1 at the transitions 24, 26, and prevent the generally planar portions 2, 4, 6 from bending with respect to each other along the transitions when tensile or compressive loads are applied to the bracket 1.

A drainage hole 40 may be provided in the second generally planar portion 4 between the first and second reinforcing members 28, 30 adjacent the transition 24. This drainage hole 40 may allow water to flow from one side of the bracket to the other during operation, to thereby prevent buildup of water behind the bracket 1.

The bracket 1 may be provided with a plurality of additional holes 42, 44 of varying size for accepting fasteners, such as nails and/or screws, to allow the bracket 1 to be fastened to a variety of building structures and solar panel structural arrangements.

Figure 3:
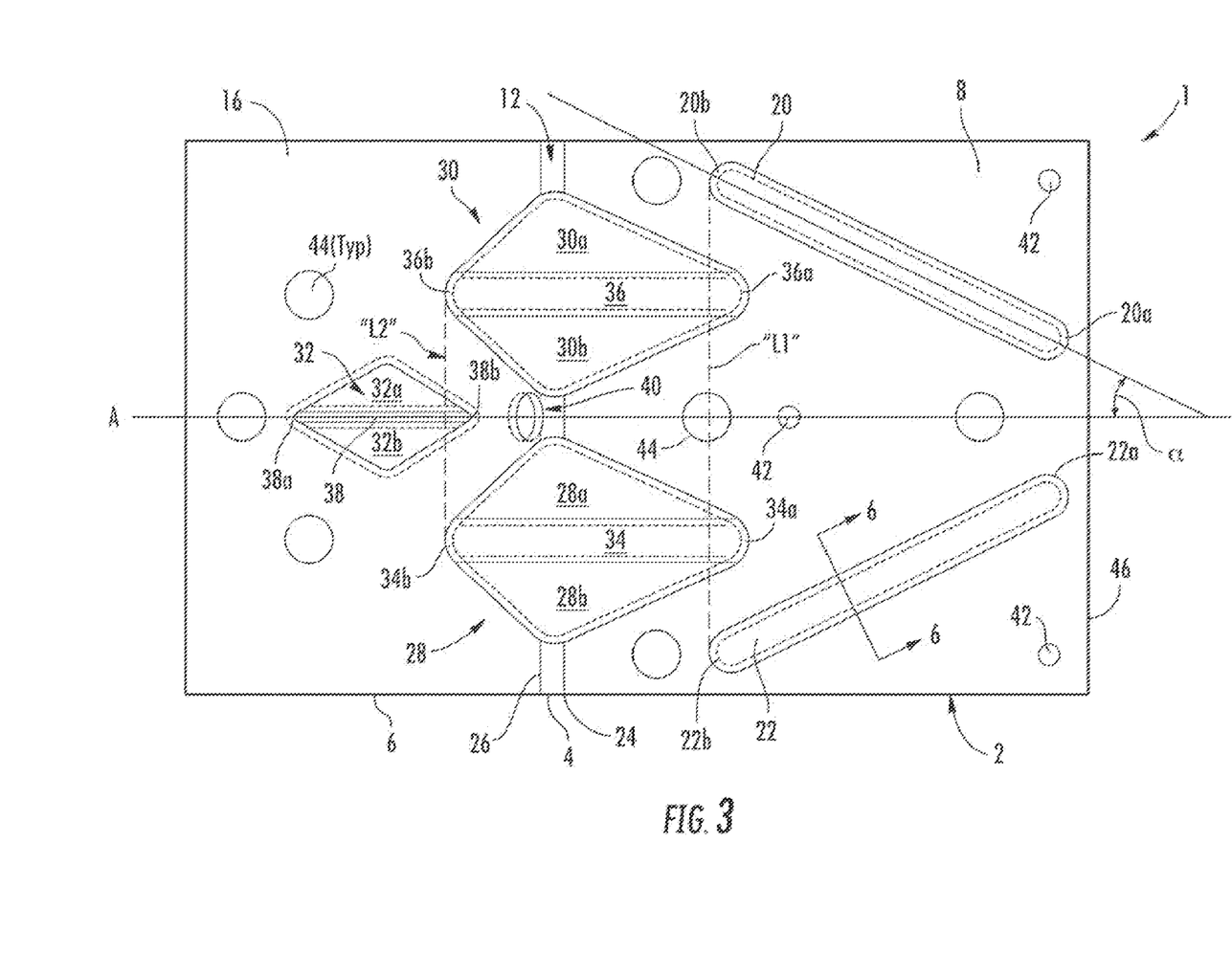
FIG. 3 is a top plan view of the bracket of FIG. 1.

Referring now to FIG. 3, the individual structural features of the bracket 1 will be described in greater detail. As previously noted, first and second elongated stiffening members 20, 22 may be disposed in or on the first generally planar portion 2. These stiffening members 20, 22 may also be disposed at oblique angles "α" with respect to the longitudinal axis "A-A" of the bracket 1. The first and second elongated stiffening members 20, 22 may have first and second ends 20a, 20b, 22a, 22b, with the first ends 20a, 22a disposed adjacent a first longitudinal end 46 of the bracket 1, and the second ends 20b, 22b extending away from the first longitudinal end 46. In the illustrated embodiment, the first and second elongated stiffening members 20, 22 are angled ("α") such that the first ends 20a, 22a are positioned a shorter lateral distance from the longitudinal axis "A-A" of the bracket 1 than the second ends 20b, 22b. By angling or "splaying" the stiffening members in this manner, longitudinal and transverse stiffening of the first generally planar portion 2 can be achieved. In one exemplary embodiment, the angle "α" may be about 25°-35°.

Figures 4, 5:
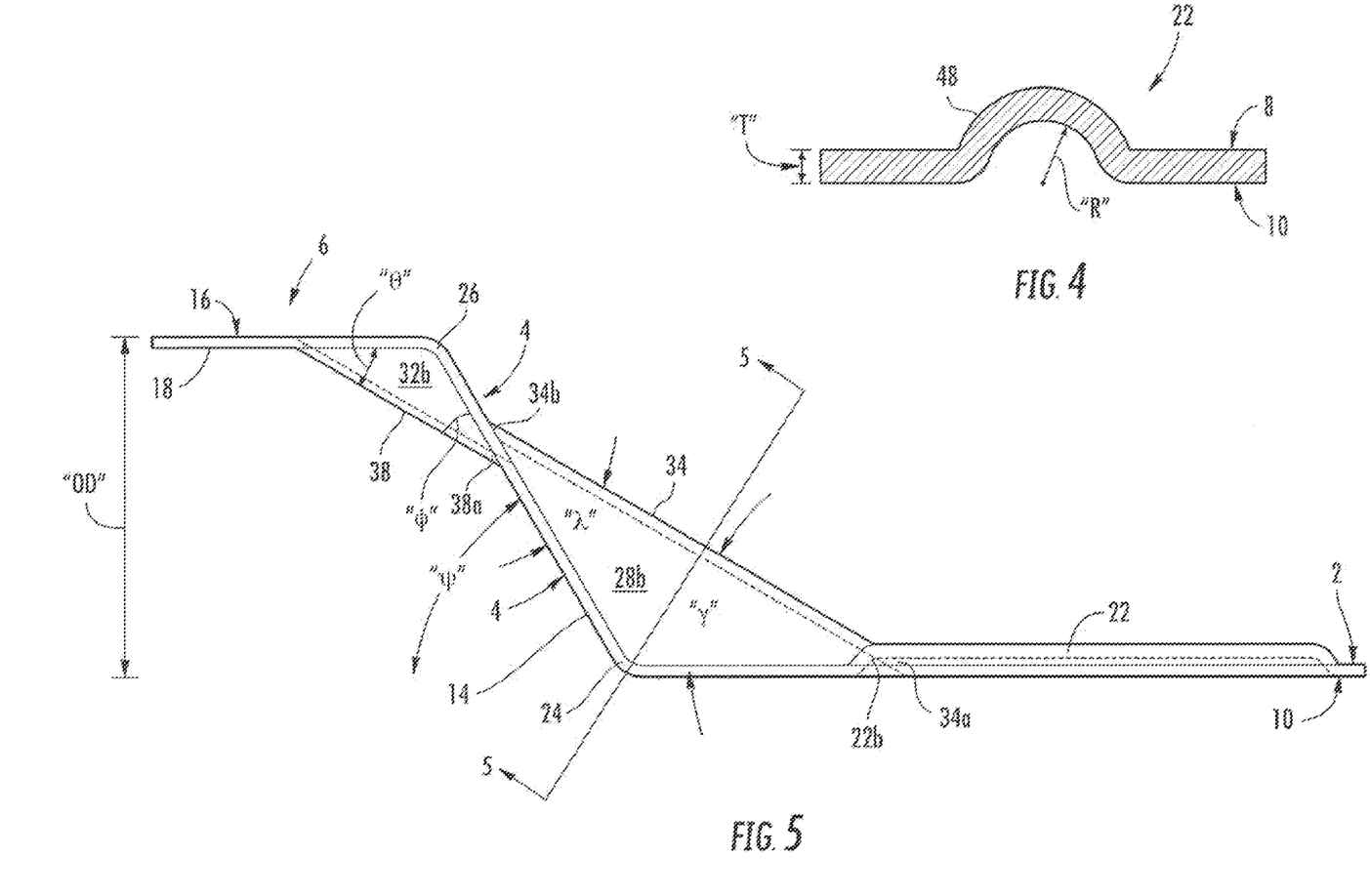
FIG. 4 is a cross-section view of a portion of the bracket of FIG. 1 taken along line 6-6 of FIG. 3.
FIG. 5 is a side view of the bracket of FIG. 1.

Referring to FIG. 4, a cross-section of the second elongated stiffening member 22 is illustrated. As can be seen, the stiffening member 22 comprises a rounded rib 48 having a radius of curvature "R." The first generally planar portion 2 may also have a thickness "T." In one embodiment, the radius of curvature "R" may be about ⅛-inch, while the thickness "T" may be about 0.060-0.075 inches. As previously noted, the stiffening members may be formed by stamping or pressing to provide a shape and size that will result in a desired stiffening effect. It will be appreciated that although the illustrated embodiment shows two elongated stiffening members 20, 22, that other shapes, numbers, configurations and sizes of stiffening members can be used to achieve a desired strengthening of the bracket 1.

Figure 6:
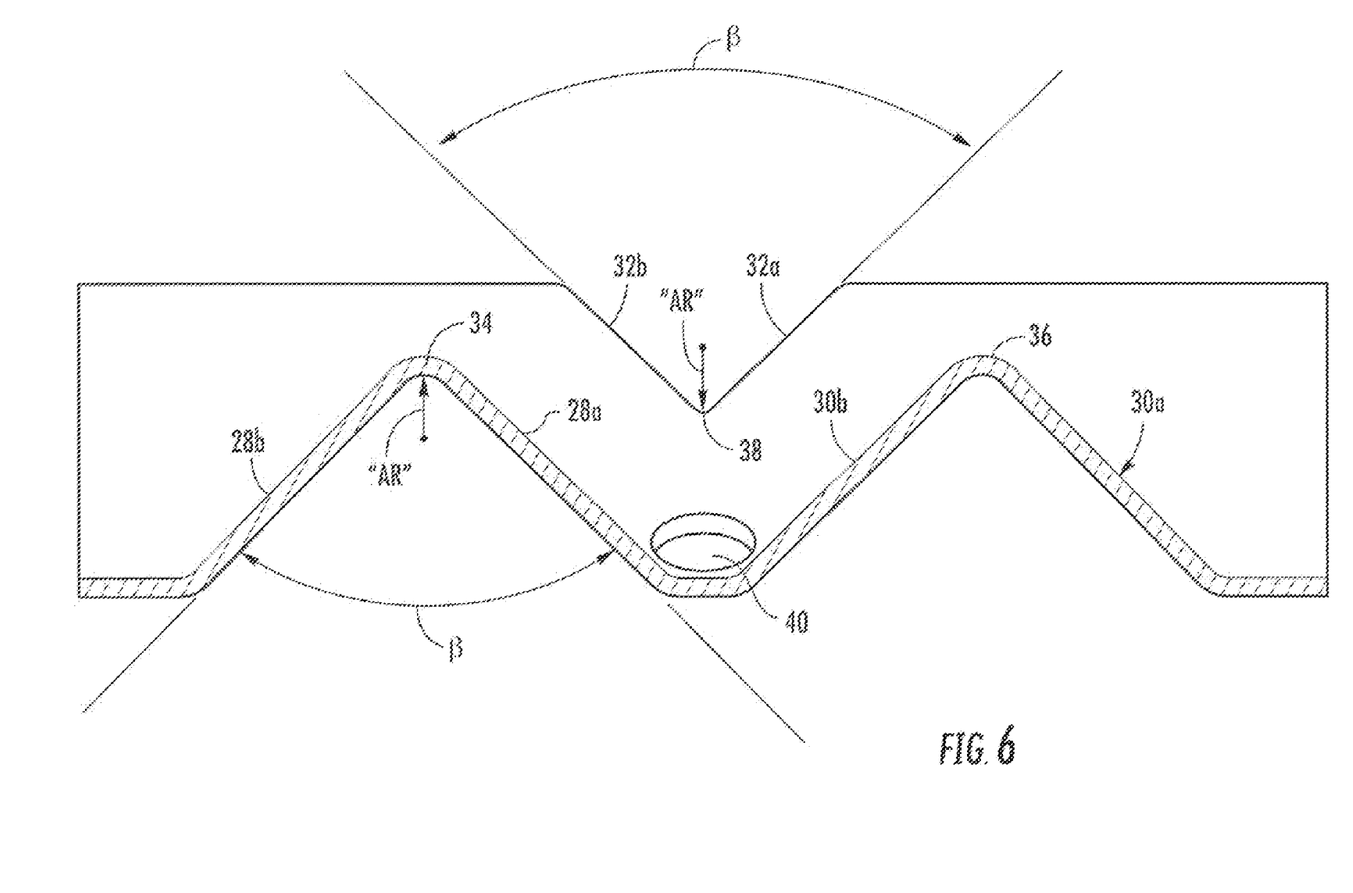
FIG. 6 is a cross-section view of the bracket of FIG. 1 taken along line 5-5 of FIG. 4.

Referring again to FIG. 3, the first, second and third reinforcing members 28, 30, 32 may each comprise a pair of angled sides 28a, 28b, 30a, 30b, 32a, 32b. As shown in FIG. 6, the angled sides of each member 28, 30, 32 may join to form an apex 34, 36, 38, with an included angle "β." In one embodiment, this included angle "β" may be about 85°-95°. It will be appreciated that although the first, second and third reinforcing members 28, 30, 32 are illustrated as being generally triangular in cross-section, that one or more of the reinforcing members may be formed into any of a variety of other geometric cross-sectional shapes (e.g., round, oval, square, polygonal).

When viewed from the end (such as in FIG. 6), the apices 34, 36, 38 may have a generally rounded shape defined by a radius of curvature "AR." For the first and second reinforcing members 28, 30, this radius of curvature "AR" may be about ⅛-3/16 inch. For the third triangular stiffening member 32, the radius of curvature "AR" may be about 1/16-⅛ inch.

The first and second elongated stiffening members 20, 22 and the first and second reinforcing members 28, 30 may be positioned such that a line "L1" (FIG. 3) drawn to connect the second ends 20b, 22b of members 20, 22 intersects the first and second reinforcing members 28, 30. This positioning enables the stiffening features to act together to further strengthen the bracket. The geometric discontinuities provided by these stiffening features limits the elastic yield of the formerly planar surfaces, providing an enhanced resistance to bending. Further, the strategic interlaced placement of the stiffening features reduces the potential for the development of a stress riser. The gusset elements of the stiffening features provide a resisting moment, and act to distribute load more efficiently, translating the forces normal to the upper plane into the lower plane, and ultimately into the building structure.

In a similar fashion, the first and second reinforcing members 28, 30 may "overlap" a portion of the third reinforcing member 32. In FIG. 3 it can be seen that the apices 34, 36, 38 of the first, second and third reinforcing members 28, 30, 32 have first and second ends 34a, 34b, 36a, 36b, 38a, 38b. Thus, a line "L2" drawn to connect the first ends 34a, 36a intersects with a portion of the third reinforcing member 32 adjacent to its first end 38a. As noted above, the strategic interlaced placement of the stiffening features reduces the potential for the development of a stress riser. The overlap between adjacent stiffening elements may also be seen in FIG. 5.

FIG. 5 also shows that the apices 34, 36 and 38 of the first, second and third reinforcing members 28, 30, 32 are obliquely angled with respect to the upper and lower surfaces of the first, second and third planar members 2, 4, 6. Thus, the apices 34, 36 of the first and second reinforcing members 28, 30 form an angle "$\gamma$" with respect to the first planar member 2, and an angle "$\lambda$" with respect to the second planar member 4. Likewise, the apex 38 of the third reinforcing member 32 forms an angle "($\rho$" with respect to the second planar member 4, and an angle "$\lambda$" with respect to the third planar member 6. In one embodiment, angles "$\gamma$," "$\lambda$," "$\phi$," and "$\theta$" may be about 25°-30°.

FIG. 5 further shows the angle "$\psi$" at which the second planar portion 4 is oriented with respect to the first and third planar portions 2, 6. In one embodiment, this angle "$\psi$" is about 55°-65°. The selection of angle "$\psi$" provides for efficient drainage for pitched roofs. In addition, an offset distance "OD" is shown as the distance from the upper surface 16 of the third generally planar portion 6 to the lower surface 10 of the first generally planar portion 2. As previously noted, this offset distance "OD" may be selected to provide a desired offset between the roofing structure and the underside of an attached solar panel to allow for airflow and drainage around and under the panel. In one embodiment the offset distance "OD" is about 2-2½ inches.

Figure 7:
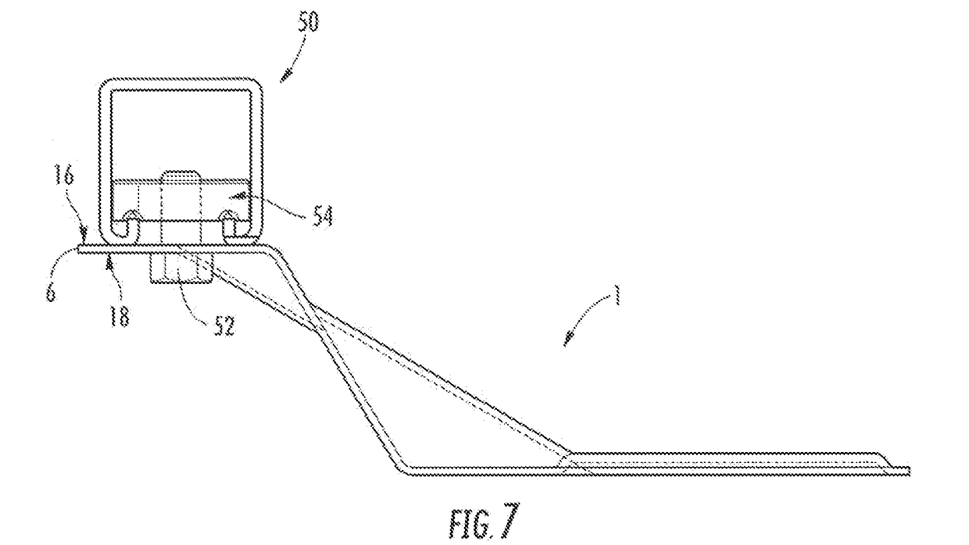
FIG. 7 is a side view of the bracket of FIG. 1 engaged with an exemplary channel section and illustrating a transverse connection with the channel section.
Figure 8:
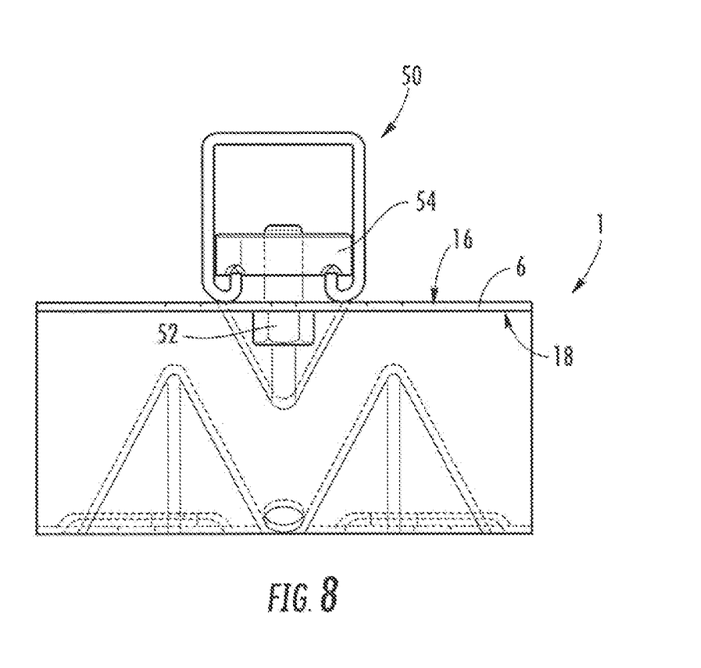
FIG. 8 is an end view of the bracket of FIG. 1 engaged with an exemplary channel section and illustrating an axial connection with the channel section.

Referring now to FIGS. 7 and 8, the bracket 1 is shown affixed to an exemplary structure, which in the illustrated embodiment is a channel section 50. The channel section 50 may be connected to the bracket 1 using a hex cap screw 52 disposed in one of the fastener holes 44 in the third planar portion 6. The threads of the hex cap screw 52 may engage corresponding threads of a channel nut 54 that is engaged with the channel section 50.

As shown in FIG. 7, the bracket 1 can engage the channel section 50 in an orientation in which the longitudinal axis of the channel section 50 is substantially parallel to the longitudinal axis "A-A" (FIG. 3) of the bracket. Or, as shown in FIG. 8, the bracket 1 can engage the channel section 50 in an orientation in which the longitudinal axis of the channel section 50 is substantially perpendicular to the longitudinal axis "A-A" of the bracket. It will of course be appreciated that the bracket 1 is configured so that it can engage a variety of structural elements other than channel sections.

Figure 9:
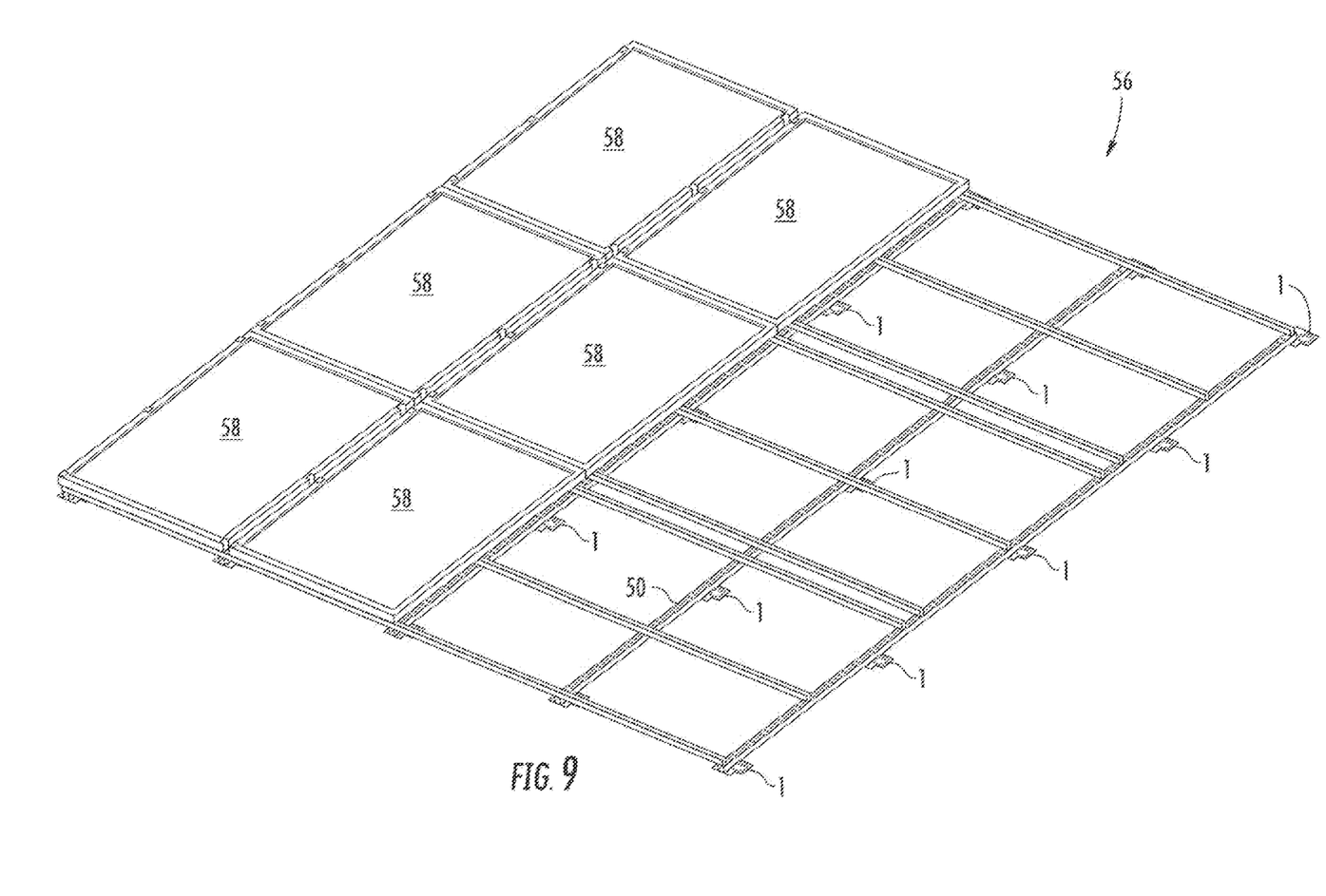
FIG. 9 is an isometric view showing a plurality of the brackets of FIG. 1 attached to an exemplary roof mounted solar panel grid system.

FIG. 9 shows a plurality of brackets 1 engaged with an exemplary roof mounted solar panel grid structure 56. The grid structure 56 is mounted to the channel sections 50, which themselves are attached to the brackets 1 in the manner described above in relation to FIGS. 7 and 8. A plurality of solar panels 58 are shown mounted on the grid structure 56.

The disclosed bracket 1 may be formed from thin gauge steel, bent to assume the appropriate shape and stamped to incorporate the previously described stiffening features. In one embodiment, the bracket 1 may be formed from sheet steel having a thickness of about 0.060-0.080 inches. The bracket may be made from either hot rolled or cold rolled steel of appropriate mechanical strengths. Other materials such as fiberglass, aluminum and reinforced polymers may also be used to produce the disclosed bracket dependent upon the needs and restrictions of the project.

Where the disclosed bracket is made from steel, it may be fabricated by blanking the raw material to the basic size in a conventional mechanical punch press. The forming of the stiffening features may be accomplished through the use of a high tonnage hydraulic press employing a die containing the desired profile. The pierced details (i.e., holes) are added after forming through the use of a conventional mechanical punch press.

The disclosed bracket provides a universal attachment mechanism for anchoring a wide range of solar panel designs through the use of a universal grid system which is attached to the structure of a building. The bracket also provides a universal mechanism for the attachment of the grid system to a wide range of building designs and roofing treatments. The attachment of the bracket to a building structure is a simple process regardless of the building configuration due to the variety of attachment points provided by the bracket. In one embodiment relating to strut grid applications, grids can be assembled as modules and lifted into place for attachment to the bracket. This attribute provides the user with reduced labor costs for the installation of a typical solar grid.

The disclosed bracket could be provided in multiple manners, dependent upon location of the project, relationships with the Solar Panel Manufacturer, Installation Contractor or end user. The bracket could be provided individually as a component to be integrated into a design. Further, the bracket could be provided to Solar Panel Manufacturers as a preferred method of attachment of their Solar Panels. It could also be provided as a part of a system approach including materials to fabricate and assemble an associated grid. Further, the bracket could be provided as a part of a total installation contract involving all or part of the structural aspects of a particular project.

While the present invention has been disclosed with reference to certain embodiments, numerous modifications, alterations and changes to the described embodiments are possible without departing from the spirit and scope of the invention, as defined in the appended claims. Accordingly, it is intended that the present invention not be limited to the described embodiments, but that it has the full scope defined by the language of the following claims, and equivalents thereof.

What is claimed is:

1. A bracket, comprising:
   first, second and third planar portions oriented along a bracket longitudinal axis;
   the first planar portion having first and second ends and an upper surface defining a first plane, the first planar portion further having a plurality of elongated stiffening members with longitudinal axes oriented at an oblique angle with respect to the bracket longitudinal axis;
   the second planar portion having first and second ends and an upper surface defining a second plane; and
   the third planar portion having first and second ends and an upper surface defining a third plane;

wherein the second end of the first planar portion is connected to the first end of the second planar portion, and the second end of the second planar portion is connected to the first end of the third planar portion such that the first and third planes are substantially parallel and the second plane is disposed at an oblique angle with respect to the first and third planes;

wherein the first and second planar portions further comprise first and second reinforcing members that span the connection between the first and second planar portions, the first and second reinforcing members having apices disposed above the upper surfaces of the first and second planar portions; and wherein the second and third planar portions further comprise a third reinforcing member that spans the connection between the second and third planar portions, the third reinforcing member further having an apex disposed below the upper surfaces of the second and third planar portions.

2. The bracket of claim 1, wherein the longitudinal axes of the plurality of elongated stiffening members are oriented at about 25° with respect to the bracket longitudinal axis.

3. The bracket of claim 1, wherein the plurality of elongated stiffening members comprise first and second elongated stiffening members disposed on opposite sides of a longitudinal centerline of the first planar portion, and first ends of the first and second elongated stiffening members are located closer to the centerline than second ends of the first and second elongated stiffening members.

4. The bracket of claim 3, wherein a line joining the second ends of the first and second elongated stiffening members intersects with the first and second reinforcing members.

5. The bracket of claim 1, wherein the apices of the first and second reinforcing members comprise first and second apex lines oriented at an oblique angle with respect to the first and second planes.

6. The bracket of claim 5, wherein the first and second apex lines are oriented at an angle of about 30° with respect to the upper surface of the first planar portion.

7. The bracket of claim 1, wherein the first and second reinforcing members each comprise first and second angled sides joined at the apex, the first and second angled sides oriented at about 90° with respect to each other.

8. The bracket of claim 1, wherein the second plane is oriented at an angle of about 120° with respect to the first and third planes.

9. The bracket of claim 1, wherein the wherein the apex of the third reinforcing member defines a line oriented at an oblique angle with respect to the second and third planes.

10. The bracket of claim 9, wherein the line is oriented at an angle of about 30° with respect to lower surfaces of the second and third planar portions.

11. The bracket of claim 10, wherein the apices of the first and second reinforcing members define respective lines that intersect with the upper surface of the second planar portion at first and second intersection points, the first, second and third reinforcing members positioned such that a line connecting the first and second intersection points intersects the third reinforcing member.

12. The bracket of claim 1, wherein the third reinforcing member comprises first and second angled sides joined at the apex, the first and second angled sides oriented at about 90° with respect to each other.

13. The bracket of claim 1, wherein the first, second and third planar portions are integrally formed from a single piece of material.

14. The bracket of claim 1, wherein the second planar portion has a hole in communication with the upper surface of the second planar portion and a lower surface of the second planar portion, one edge of the hole being disposed directly adjacent to the connection between the first and second planar portions.

15. The bracket of claim 14, wherein the hole is disposed between the first and second reinforcing members.

16. The bracket of claim 1, wherein the first and third planar portions further comprise a plurality of fastener holes disposed at predetermined locations for connecting the bracket to adjacent structures.

17. A solar panel support system, comprising:
a solar panel support grid; and
a bracket comprising:
first, second and third planar portions oriented along a bracket longitudinal axis;
the first planar portion having first and second ends and an upper surface defining a first plane, the first planar portion further having a plurality of elongated stiffening members with longitudinal axes oriented at an oblique angle with respect to the bracket longitudinal axis;
the second planar portion having first and second ends and an upper surface defining a second plane; and
the third planar portion having first and second ends and an upper surface defining a third plane;
wherein the second end of the first planar portion is connected to the first end of the second planar portion, and the second end of the second planar portion is connected to the first end of the third planar portion such that the first and third planes are substantially parallel and the second plane is disposed at an oblique angle with respect to the first and third planes;
wherein the first and second planar portions further comprise first and second reinforcing members that span the connection between the first and second planar portions, the first and second reinforcing members having apices disposed above the upper surfaces of the first and second planar portions; and
wherein the second and third planar portions further comprise a third reinforcing member that spans the connection between the second and third planar portions, the third reinforcing member further having an apex disposed below the upper surfaces of the second and third planar portions; and
wherein the third planar portion of the bracket is engaged with the solar panel support grid via fasteners disposed in the fastener holes of the third planar portion, and the first planar portion of the bracket is engaged with the roof structure via fasteners disposed in the fastener holes of the first planar portion.

18. The solar panel support system of claim 17, wherein the longitudinal axes of the plurality of elongated stiffening members are oriented at about 25° with respect to the bracket longitudinal axis.

19. The solar panel support system of claim 17, wherein the plurality of elongated stiffening members comprise first and second elongated stiffening members disposed on opposite sides of a longitudinal centerline of the first planar portion, and first ends of the first and second elongated stiffening members are located closer to the centerline than second ends of the first and second elongated stiffening members.

20. The solar panel support system of claim 19, wherein a line joining the second ends of the first and second elongated stiffening members intersects with the first and second reinforcing members.

21. The solar panel support system of claim 17, wherein the apices of the first and second reinforcing members comprise first and second apex lines oriented at an oblique angle with respect to the first and second planes.

22. The solar panel support system of claim 21, wherein the first and second apex lines are oriented at an angle of about 30° with respect to the upper surface of the first planar portion.

23. The solar panel support system of claim 17, wherein the first and second reinforcing members each comprise first and second angled sides joined at the apex, the first and second angled sides oriented at about 90° with respect to each other.

24. The solar panel support system of claim 17, wherein the second plane is oriented at an angle of about 120° with respect to the first and third planes.

25. The solar panel support system of claim 17, wherein the wherein the apex of the third reinforcing member defines a line oriented at an oblique angle with respect to the second and third planes.

26. The solar panel support system of claim 25, wherein the line is oriented at an angle of about 30° with respect to lower surfaces of the second and third planar portions.

27. The solar panel support system of claim 26, wherein the apices of the first and second reinforcing members define respective lines that intersect with the upper surface of the second planar portion at first and second intersection points, the first, second and third reinforcing members positioned such that a line connecting the first and second intersection points intersects the third reinforcing member.

28. The solar panel support system of claim 17, wherein the third reinforcing member comprises first and second angled sides joined at the apex, the first and second angled sides oriented at about 90° with respect to each other.

29. The solar panel support system of claim 17, wherein the first, second and third planar portions are integrally formed from a single piece of material.

30. The solar panel support system of claim 17, wherein the second planar portion has a hole in communication with the upper surface of the second planar portion and a lower surface of the second planar portion, one edge of the hole being disposed directly adjacent to the connection between the first and second planar portions.

31. The solar panel support system of claim 30, wherein the hole is disposed between the first and second reinforcing members.

32. The solar panel support system of claim 17, wherein the first and third planar portions further comprise a plurality of fastener holes disposed at predetermined locations for connecting the bracket to adjacent structures.

* * * * *